Patented Oct. 20, 1931

1,828,588

UNITED STATES PATENT OFFICE

OSCAR BALLY AND PAUL GROSSMANN, OF BASEL, SWITZERLAND, ASSIGNORS TO SOCIETY OF CHEMICAL INDUSTRY IN BASLE, OF BASEL, SWITZERLAND

AMINOANTHRAQUINONE DERIVATIVES AND PROCESS OF MAKING SAME

No Drawing. Application filed August 13, 1927, Serial No. 212,838, and in Switzerland August 26, 1926.

This invention relates to the manufacture of aminoanthraquinone derivatives by the action of an aldehyde of the aliphatic or aromatic series, or of an agent giving rise to such an aldehyde and of formic acid, on an aminoanthraquinone or a derivative thereof, such as inter alia an aminoanthraquinone-sulphonic acid, an amino-halogen-anthraquinone, or an amino-methyl-anthraquinone; these products are probably products of alkylation, or aralkylation.

The expression "by the action of an aldehyde and of formic acid" comprises not only the simultaneous action of these compounds on the aminoanthraquinone compounds, but also the single action of one compound after the other in any desired sequence.

The products can be used directly as valuable dyestuffs. According to their constitution the products thus obtained may also be further worked up. For instance, if they contain nitro groups, they may be converted into amino derivatives by reduction or by double decomposition with aromatic amines. If they contain acidylamino-groups, they may be saponified. The products thus obtained are valuable for the production of fast tints on acetate silk, for the dyeing of lacquers derived from cellulose or from other origin, for the preparation of pigments, etc. They may also be sulphonated whereby compounds are produced which can be used as wool-dyestuffs.

The invention is illustrated by the following examples, the parts being by weight:—

*Example 1.*—26 parts of 1-amino-4-nitro-anthraquinone are suspended in an enamelled vessel by thoroughly stirring with 150 parts of formic acid of 83.5 per cent strength. To this suspension there are added at ordinary temperature 50 parts of an aqueous solution of formaldehyde of 40 per cent. strength by volume. The mixture is then stirred at the temperature of the water-bath until a sample, reduced by means of sodium sulphide and dissolved in alcohol, no longer shows any further change of tint towards blue. When this condition has been attained, the product is diluted with water and filtered, the solid matter being washed and dried. There is produced a brick-red powder corresponding most probably with the formula

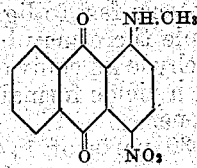

sparingly soluble in alcohol and freely soluble in nitrobenzene to a red solution. The solution in concentrated sulphuric acid is dirty violet.

By reducing the nitro-group, for instance by introducing the new product obtained according to the preceding paragraph into a solution of 65 parts of crystallized sodium sulphide in 450 parts of water, heating for one hour at 90° to 95° C., filtering and washing, there is obtained very probably a methyl-diamino-anthraquinone, the constitution of which corresponds most probably with the formula

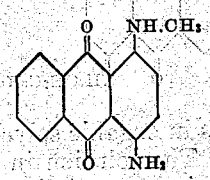

which, in contrast with the 1:4-diamino-anthraquinone, which dissolves in organic solvents, like alcohol, to a red-violet solution, dissolves in such solvents to a solution having a very bluish-violet color. The new compound dyes forms of cellulose ester, such as acetate silk, fast violet tints.

The product prepared in a similar manner by means of a furfural dyes acetate silk red-violet.

Instead of reducing the nitro-group, the latter may be exchanged for other groups. For instance, the compound produced as described in the first paragraph of this example may be treated at 180–190° C. with an excess of aniline until a sample in alcohol shows no further change of color towards blue. The change of color very probably corresponds with the substitution of an $NHC_6H_5$-group for the nitro-group. On pouring the mass into cold, dilute hydrochloric acid and filtering, washing and cautiously drying the solid matter, there is obtained a new compound having most probably the formula

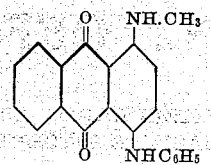

which dissolves in organic solvents to a blue solution. The solution in concentrated sulphuric acid appears olive in thin layers, violet bordeaux in thick layers. The new compound dyes acetate silk fast blue tints which are particularly very fast to light.

In this example there may be substituted for the formaldehyde an equivalent quantity of an agent which yields formaldehyde, such as trioxymethylene.

*Example 2.*—30 parts of 1:4-diaminoanthraquinone are mixed in manner analogous to that described in Example 1 with 150 parts of formic acid and 30 parts of benzaldehyde, and the mixture is maintained on the water-bath until a sample dissolved in nitrobenzene shows no further change of the pure blue solution towards green.

The product is worked up in the manner described in Example 1 and is a dark powder the constitution of which corresponds most probably with the formula

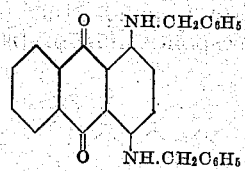

which dissolves in organic solvents to a pure blue solution. The solution in concentrated sulphuric acid is brown. By sulphonation there is obtained a dyestuff which dyes wool in an acid bath blue.

Instead of the aldehyde used in the foregoing examples other aldehydes of the aliphatic or aromatic series may be condensed with the various mono-, di-, and polyamines of the anthraquinone series.

*Example 3.*—20 parts of 1:5-diamino-4:8-dinitroanthraquinone are suspended in 300 parts of formic acid of 83.5 per cent. strength in an enamelled stirring vessel and the whole is mixed, while stirring well, with 10 parts of formaldehyde of 40 per cent. strength by volume. The mixture is maintained at the temperature of the water-bath until a sample reduced by means of sodium sulphide shows in alcoholic solution no further change of tint towards blue. The product is worked up in the manner described in Example 1.

The reduction product is a blue powder corresponding most probably with the formula

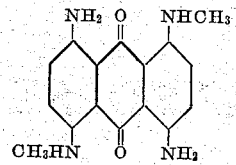

soluble in organic solvents to a pure blue solution. It dyes acetate silk very clear, fast blue tints.

A similar compound is obtained by treating the dibenzoyl derivative of 1:4:5:8-tetraaminoanthraquinone with formaldehyde and then eliminating the benzoyl-groups by saponification.

1:8-diamino-4:5-dinitroanthraquinone, either alone or mixed with 1:5-diamono-4:8-dinitroanthraquinone, can also be subjected to methylation in the manner described in this example.

*Example 4.*—20 parts of 1-amino-4-anilido-anthraquinone are dissolved, while stirring well, in 200 parts of formic acid of 83.5 per cent. strength and 10 parts of acetaldehyde are added while the temperature is kept at about 20° C. The brown-violet solution changes immediately towards green-blue and in a short time becomes dark-violet. The reaction is soon completed, the end being recognized by the pure blue color of a solution formed by dissolving a sample in alcohol. The ethylation product is obtained in the form of a dark precipitate by the addition of water. It has most probably the formula

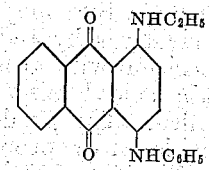

The products obtainable from 1-methylamino-4-amino-anthraquinone also dissolve with blue color in alcohol.

*Example 5.*—11.9 parts of the technical mixture of 1:5-and 1:8-diamino-anthraquinone are stirred with 500 parts of formic acid of 85 per cent. strength and 3.1 parts of paraformaldehyde at 50–60° C. until a sample dissolved in alcohol shows no further change of tint towards red. As soon as this condition is attained, the mass is poured into water and the bordeaux colored flocks are filtered, washed until neutral and dried. There is obtained a bordeaux colored powder consisting of a mixture of the products having most probably the formula

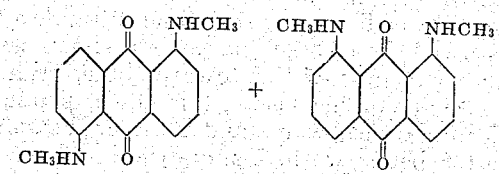

soluble in alcohol and other organic solvents to a blue-red solution. In cold, concentrated sulphuric acid the product dissolves to a pale yellow-brown solution. The product dyes acetate silk blue-red tints.

*Example 6.*—20 parts of 1:4-amino-hydroxy-anthraquinone are stirred with 250 parts of formaldehyde solution of 35 per cent. strength and 250 parts of alcohol for 6 hours at 60° C. The blue-red color of the solution gradually fades and a violet body, crystallizing in needles, separates. This is filtered, washed with alcohol, water and dried. The new product forms violet needles, sparingly soluble in most organic solvents to a violet solution. The solution in strong sulphuric acid is in a thin layer green, in a thick layer brown-red.

This body is mixed with 200 parts of formic acid of 85% strength, and the whole is boiled in a reflux apparatus until all has dissolved and a sample poured into alcohol no longer shows a change of color towards violet. Hereupon the whole is poured into water and the solid matter filtered, washed and dried. The product corresponding most probably with the formula

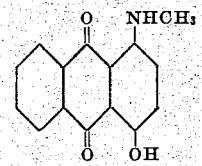

is a violet powder, soluble in alcohol to a blue-red solution, and in strong sulphuric acid to an orange-solution. It dyes acetate silk violet.

*Example 7.*—50 parts of 2-amino-anthraquinone are stirred with 750 parts of formic acid of 85 per cent. strength for a long time at 50–60° C. The formyl-2-amino-anthraquinone thus produced is filtered and washed with formic acid. The pale yellow crystalline product is then stirred with 1000 parts of formic acid of 95 per cent. strength and 100 parts of para-formaldehyde at 60–80° C. until the parent material is no longer recognizable and the yellow, thickly liquid mass has become red and more limpid. The mass is then poured into water and the solid matter filtered, washed and dried. There is obtained a red-brown powder the constitution of which corresponds most probably with the formula

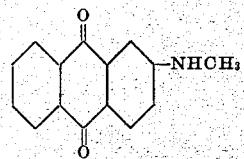

which dissolves in glacial acetic acid, alcohol and chloro-benzene to a brownish orange solution.

When 1:4-amino-methoxy-anthraquinone is similarly treated, a new product is obtained which in contrast with the parent material dissolves in alcohol and chlorobenzene to a red-violet solution.

From 1:4-amino-hydroxy-anthraquinone a compound is obtained which is very similar to the final product of Example 6.

*Example 8.*—22.3 parts of 1-amino-anthraquinone are stirred for a long time at 60° C. with 175 parts of chlorobenzene and 6.3 parts of para-formaldehyde. There separates gradually a red-orange body and the 1-amino-anthraquinone disappears. The mass is then filtered and the solid matter washed and dried. There is obtained an orange powder, sparingly soluble in the usual organic solvents to an orange solution. In a great quantity of concentrated sulphuric acid it dissolves to a violet solution from which addition of water precipitates it in the form of red-orange flocks.

The body is now boiled with formic acid in a reflux apparatus whereby it is gradually dissolved to a blue-red solution. When this condition is attained, the solution is filtered from impurities and the filtrate is poured into water; the blue-red flocks which separate are filtered, washed and dried. The product thus obtained has most probably the formula

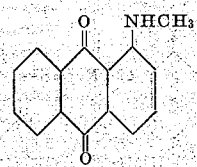

*Example 9.*—47.8 parts of 1:4-amino-hydroxy-anthraquinone are stirred at 20–30° C. with 600 parts of formic acid of 85 per cent. strength and 150 parts of crotonic aldehyde until the color of the mixture has become brownish-violet. The mass is then poured into water, filtered, washed and dried. There is thus obtained a darkly colored powder corresponding most probably with the formula

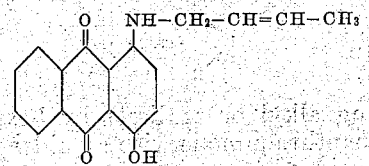

which dissolves in alcohol to a violet and in concentrated sulphuric acid to a brown-olive solution.

*Example 10.*—50 parts of the condensation product obtained as described in Example 2 from 1:4-diamino-anthraquinone and benzaldehyde are dissolved in 200 parts of sulphuric acid monohydrate and there are added gradually 200 parts of fuming sulphuric acid of 28 per cent. strength. This sulphonation mixture is kept at 40–45° C. until a sample is completely soluble in water. After the mass has been poured into ice-water the dyestuff is salted out in the usual manner, filtered and dried. It is a dark blue powder corresponding probably with the formula

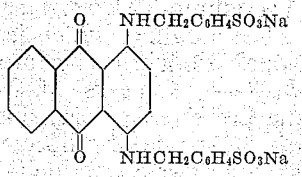

which dyes wool in an acid bath blue tints.

Other condensation products obtained in accordance with this invention may similarly be sulphonated.

*Example 11.*—10 parts of the technical mixture of diaminochrysazine-sulphonic acid and diamino-anthrarufin-sulphonic acid are treated in an enamelled vessel with 60 parts of formic acid of 83.5 per cent. strength and 25 parts of formaldehyde of 40 per cent. strength by volume at the temperature of the water-bath until the originally violet-blue of the mass has become green-blue and shows no further change in tint.

The mass is then diluted with water and the product is salted out, filtered and dried. It is a dark blue powder consisting probably of a mixture of the two products corresponding with the formula

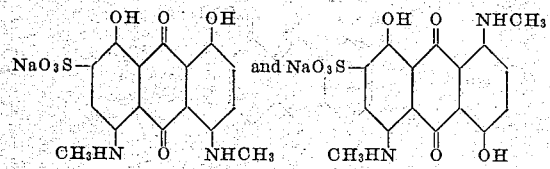

soluble to a pure blue solution in water. The aqueous solution remains blue on the addition of hydrochloric acid. The dyestuff thus obtained dyes wool in an acid bath pure blue tints.

What we claim is:—

1. As a step in the production of α-amino anthraquinone derivatives, the conversion of an NH₂-group to an

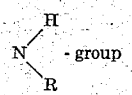

(R being alkyl or aralkyl) by heating an α-aminoanthraquinone with an aldehyde and formic acid.

2. As a step in the production of α-amino anthraquinone derivatives, the conversion of an NH₂-group to an

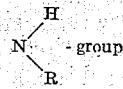

(R being alkyl or aralkyl) by heating an α-aminoanthraquinone substituted in the corresponding para-position, with an aldehyde and formic acid.

3. As a step in the production of α-aminoanthraquinone derivatives, the conversion of an NH₂-group to an

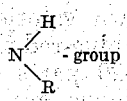

(R being alkyl or aralkyl) by heating an α-aminoanthraquinone substituted in the corresponding para-position by a nitro-group with an aldehyde and formic acid.

4. As a step in the production of α-aminoanthraquinone derivatives, the conversion of an NH₂-group to an NHCH₃-group by heating an α-aminoanthraquinone substituted in 4-position by a nitro-group with formaldehyde and formic acid.

In witness whereof we have hereunto signed our names this 3rd day of August, 1927.

OSCAR BALLY.
PAUL GROSSMANN.